United States Patent [19]

Gregorio

[11] 4,260,025
[45] Apr. 7, 1981

[54] DEVICE FOR AUTOMATICALLY LIFTING AND RAPIDLY LOWERING TRACTOR IMPLEMENTS

[75] Inventor: Angelo Gregorio, Modena, Italy

[73] Assignee: Fiat Trattori S.p.A., Modena, Italy

[21] Appl. No.: 46,277

[22] Filed: Jun. 7, 1979

[30] Foreign Application Priority Data

Jul. 28, 1978 [IT] Italy .............................. 68809 A/78

[51] Int. Cl.³ .......................................... A01B 63/112
[52] U.S. Cl. ..................................... 172/12; 254/124
[58] Field of Search .................... 254/124; 172/5, 233, 172/465, 439, 7, 9, 11, 12

[56] References Cited

U.S. PATENT DOCUMENTS

| 3,191,687 | 6/1965 | Bunting | 172/465 |
| 3,497,015 | 2/1970 | Ward | 172/465 |

*Primary Examiner*—Robert C. Watson

*Attorney, Agent, or Firm*—Sughrue, Rothwell, Mion, Zinn & Macpeak

[57] ABSTRACT

A device for lifting an implement carried by an agricultural tractor three-point linkage has a flexible bar connected at its ends to the said lower linkage arms for rotation about a transverse axis, the reaction forces transmitted from the ground to the implement, when the latter is lowered into the ground, causing flexural deformation of the bar in a horizontal plane to effect operation of a distributor control shaft through a linkage which includes a first lever fixed at one end to the center of the bar, and acting through an inclined slot and pin on a second lever so that the weight of the implement when lifted from the ground causes the linkage arms to rotate about their connections to the respective tie-rods, deforming the flexible bar in a vertical plane and causing rotation of the distributor control shaft in a sense to return the implement rapidly to the ground.

2 Claims, 3 Drawing Figures

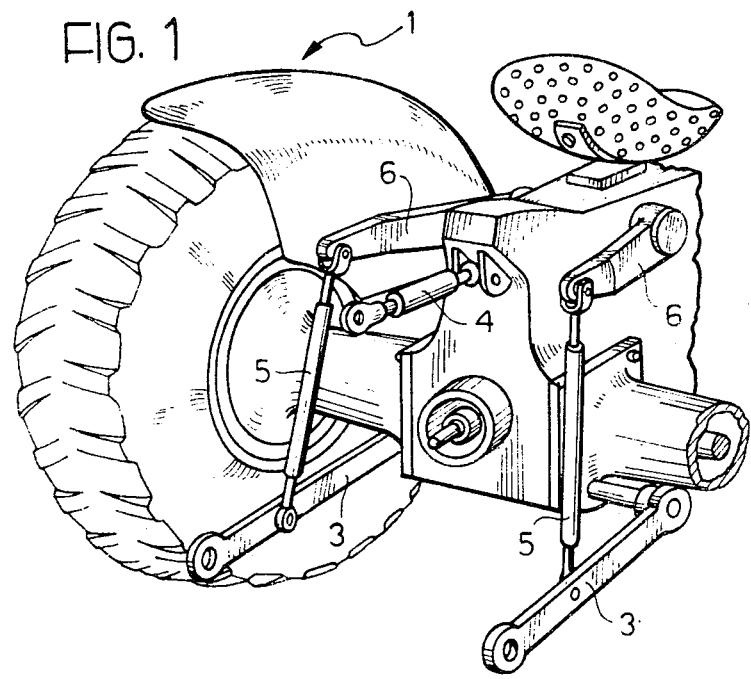
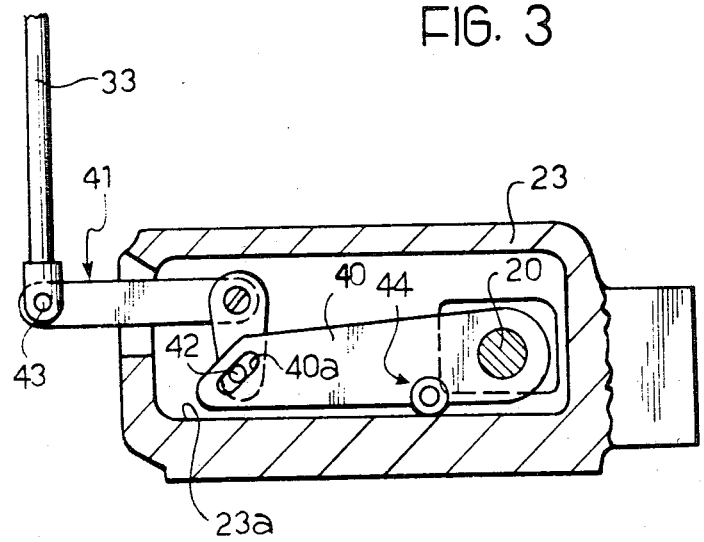

DEVICE FOR AUTOMATICALLY LIFTING AND RAPIDLY LOWERING TRACTOR IMPLEMENTS

DESCRIPTION

The present invention relates to devices for lifting implements carried by agricultural tractors, of the kind comprising:

means for the articulated linkage of an implement to an agricultural tractor, adapted to allow movements of the implement in a longitudinal vertical plane, said means including at least one pair of lower linkage arms, and respective substantially vertical tie-rods pivotally connected to the two lower linkage arms;

a hydraulic single acting lifting jack having an actuator rod connected through a lever transmission to the said tie-rods for effecting lifting of the implement;

hydraulic supply means for supplying hydraulic fluid to the said jack;

a hydraulic distributor interposed between the hydraulic supply means and the lifting jack, for controlling the operation of said jack, the said hydraulic distributor having a control member which is movable between an idle position in which the lifting jack is not supplied with pressure fluid, and the implement is lowered, and a working position in which the lifting jack is supplied with pressure fluid to effect lifting of the implement;

a flexible bar connected at its ends to the said lower linkage arms, and supported for rotation about a transverse axis by the fixed structure of the tractor, in such a manner that the reaction force transmitted from the ground to the implement, when the latter is lowered into the ground, causes flexural deformation of said flexible bar in a substantially horizontal plane, and a mechanical transmission interconnecting the flexible bar and the control member of the hydraulic distributor to cause movement of said control member towards its working position, and effect lifting of the implement, when the said reaction force exceeds a predetermined value.

In devices of the kind specified above, commonly known as "controlled stress" devices, as soon as the implement carried by the tractor is lifted out of the ground, as a result of the aforesaid predetermined value of the ground reaction force being exceeded, then the flexible bar returns to its original shape, causing discharge of pressure fluid from the jack and allowing re-lowering of the said implement.

More particularly where the implement is relatively light, such lowering may not be quick enough to allow even working of the ground.

The object of the present invention is to achieve a device of the aforesaid type which makes it possible to effect, by simple mechanical means, rapid return to the original working conditions of the implement carried by the tractor after the said implement has been lifted as a result of the said predetermined value of the ground reaction force being exceeded.

With a view to achieving the aforesaid object, the present invention provides a device for lifting an implement carried by an agricultural tractor of the kind specified above, characterised in that:

each said substantially vertical tie-rod is pivotally connected to the respective lower linkage arm at a point such that the weight of the implement when the latter is raised from the ground induces rotation of said linkage arm about its respective pivotal connection to the vertical tie-rod, causing flexural deformation of the flexible bar in a substantially vertical plane;

the said mechanical transmission includes a first lever fixed at one end to the central region of the flexible bar, and provided at its opposite end with a groove or slot disposed in a vertical plane, and an L-shaped second lever, pivotally mounted at its apex about a horizontal axis transverse the fixed structure of the tractor and provided at the end of one of its arms with a pin which is engaged slidably in the groove or slot of the first lever; the opposite end of the said second lever being connected to the control member of the hydraulic distributor; the first lever being pivotable about a horizontal transverse axis upon a fulcrum which is displaceable longitudinally relative to the fixed structure of the tractor;

the said guide groove or slot of the first lever is elongate in a direction inclined both to the longitudinal axis of the first lever and also to the longitudinal axis of that arm of the second lever which is provided with the said pin, and longitudinal movement of the first lever due to a forward movement of the central region of the flexible bar, and a rotation of the first lever about the said displaceable fulcrum, due to a downward movement of the central region of the flexible bar, both induce respective rotations, in opposite directions, of the L-shaped second lever about its articulation on the fixed structure of the tractor.

The mechanical transmission acts on the control member of the hydraulic distributor as a result of the said deformation of the flexible bar in the said substantially vertical plane, so as to return the control member to its idle position.

The invention will now be described, by way of example, with reference to the accompanying drawings, in which:

FIG. 1 is a perspective view of a three-point linkage for agricultural implements mounted on the rear of a tractor;

FIG. 3 is a lateral view, partly in section, of a detail of the device shown in FIG. 2, on an enlarged scale.

Figure 2:
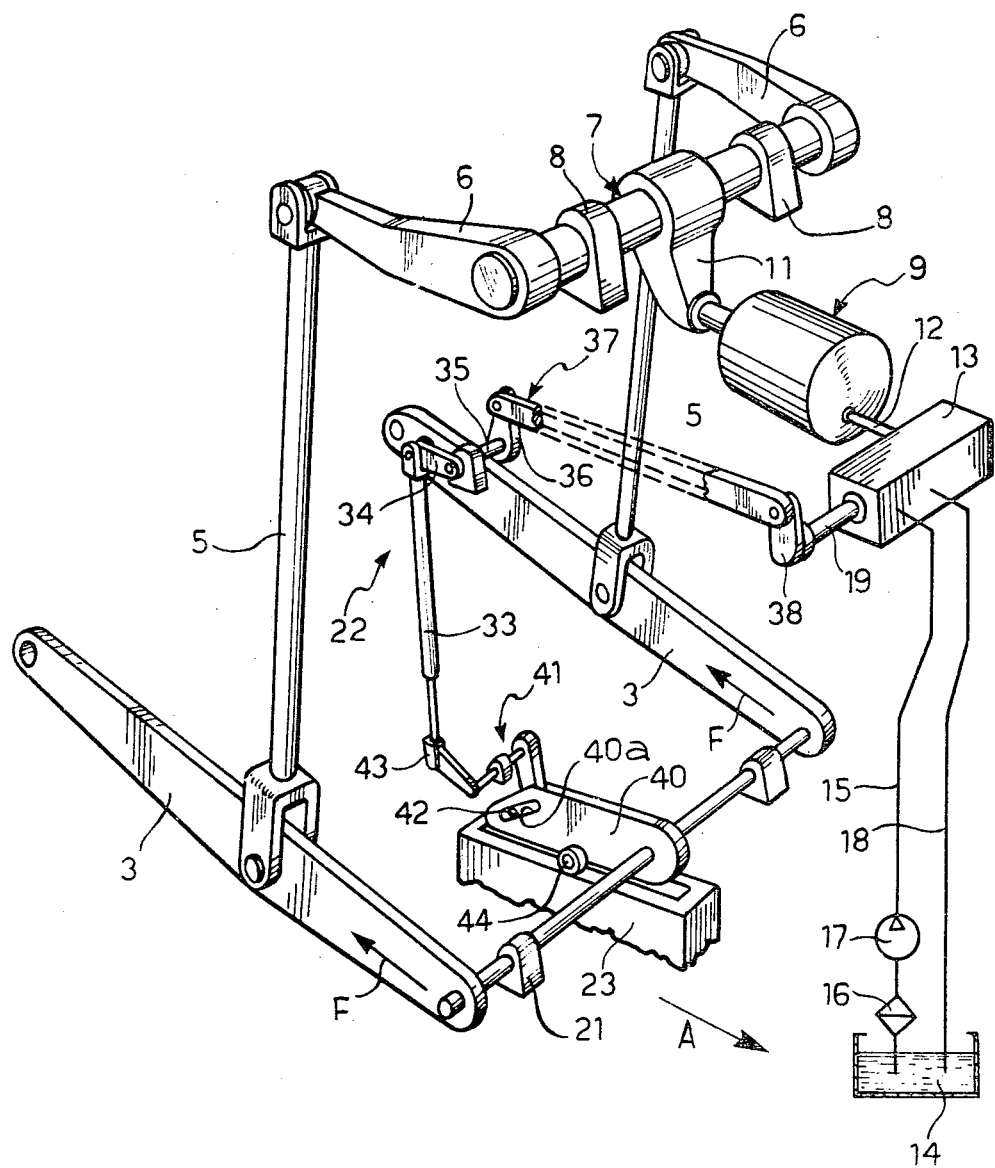
FIG. 2 is a perspective view of a lifting device according to one embodiment of the invention associated with a linkage such as that illustrated in FIG. 1.

In the drawings reference numeral 1 indicates generally a tractor provided at the rear with a three-point linkage 2 for supporting agricultural implements. The linkage 2 consists of two lower arms 3, each connected at one end to the fixed structure of the tractor 1, and of an upper screwjack 4, also connected at one end to the fixed structure of the tractor 1. The free ends of the lower arms 3 and of the upper screw-jack 4 are adapted to be connected to an agricultural implement (not shown) to be carried by the tractor 1.

The lower arms 3 of the three-point linkage 2 are attached by a pair of tie-rods 5 to the free ends of respective lifting arms 6, the other ends of which are fixed to a common shaft 7 (see FIG. 2) supported for rotation about a horizontal transverse axis by two supports 8 on the fixed structure of the tractor 1.

In linkages of this kind, lifting of the implement is effected by rotating the shaft 7 to which the arms 6 are fixed, so as to lift the lower arms 3 through the tie-rods 5.

FIG. 2 shows a hydraulic single-acting jack 9 having an actuator rod 10 which acts upon a lug 11 fixed to the shaft 7 for effecting rotation of the said shaft 7 to lift the lower arms 3 of the three-point linkage 2. The hydraulic jack 9 is connected through a pipe 12 to a hydraulic distributor 13. The hydraulic distributor 13 is connected to a tank 14 through a delivery pipe 15, in which a filter 16 and a pump 17 are connected in series. The distributor 13 also has a direct connection to the tank 14 through a return pipe 18.

The hydraulic distributor 13 is provided with a movable control member 19 which is movable between an idle position, in which the pipe 15 communicates via the return pipe 18 directly with the tank 14, and a working position, in which the delivery pipe 15 communicates with the pipe 12 supplying hydraulic pressure fluid to the hydraulic jack 9. When the distributor control member 19 is in its idle position, the hydraulic jack 9 is not supplied with pressure fluid, and the lifting arms 6 on the shaft 7 are in their lowered positions, in which the implement is lowered onto the ground. When the control member 19 is in its working position, the hydraulic jack 9 is supplied with pressure fluid, effecting lifting of the arms 6 and lifting the implement carried by the tractor.

The control member 19 of the hydraulic distributor 13 can be provided, in a conventional manner, with a lever (not shown) manually operable to cause movement of the control member 19 from its idle position to its working position and vice versa in order to manually effect the lifting and lowering of the implement supported by the three point linkage of the tractor.

The lifting device is designed for "controlled stress" operation. The lower arms 3 of the three-point linkage 2 are joined to opposite ends of a flexible bar 20, supported for rotation about a transverse horizontal axis by a pair of supports 21 on the fixed structure of the tractor 1. The flexible bar 20 tends to deform flexurally in a horizontal plane when the implement is working in the ground, as a result of the reaction force transmitted from the ground to the implement, and therefore to the arms 3, as the tractor advances in the direction of forward travel A.

A mechanical transmission 22 connects the flexible bar 20 to the movable control member 19 of the hydraulic distributor 13. Although FIG. 2 shows a simplified form of the transmission 22, it will be understood that any other mechanical transmission may be employed which is capable of converting the deformation of the flexible bar 20 due to the ground reaction forces F into a corresponding movement of the distributor control member 19. Thus in the example, shown in FIG. 2, in which the control member 19 consists of a shaft rotatable around its longitudinal axis, the mechanical transmission 22 could be replaced by any transmission capable of converting the movement of the flexible bar 20 into a corresponding rotation of the control member 19.

FIG. 3 shows on an enlarged scale the connection between the central region of the flexible bar 20 and the mechanical transmission 22.

Reference numeral 23 in FIGS. 2 and 3 indicates a support fixed to the structure of the tractor 1. A lever 40 is connected at one of its ends to the central region of the flexible bar 20, mid-way between the supports 21. At its opposite end the lever 40 is formed with a slot 40a.

An L-shaped lever 41 is articulated at its apex about a horizontal fixed transverse axis on the support 23 and is provided at one of its ends with a pin 42 which engages in the slot 40a of the lever 40. The opposite end of the lever 41 has a pivotal connection 43 to the lower end of a link 33.

Intermediate its ends the lever 40 rests upon a support roller 44 which is rotatable about a horizontal transverse axis on a longitudinal guide 23a formed in the fixed support 23, for the purpose of displacing the pivot axis of the lever 40 longitudinally along the support 44.

The slot 42 in the lever 40 is inclined to the longitudinal axis of the lever so that a longitudinal forward displacement of the lever 40, in the direction A (FIG. 2) causes rotation in one direction of the L-shaped lever 41, whilst a rotation of the lever 40 about the fulcrum defined by the support roller 44 causes a rotation of the lever 41 in the opposite direction.

The link 33 is connected at its upper end to a crank arm 34 fixed to one end of a shaft 35 which has at its opposite end a crank arm 36 which in turn is pivotally connected at its free end to a link 37. The link 37 is connected at its end opposite to the lever 36 to a crank arm 38 fixed to the movable control member 19 of the hydraulic distributor 13.

The operation of the device shown in FIG. 2 is as follows. When the implement is working in the ground, the reaction force transmitted from the ground to the implement, due to the forward movement of the tractor, results in forces F being applied to the ends of the bar 20 which are connected to the lower arms 3 of the three-point linkage 2, inducing flexural deformation of the flexible bar 20 in a substantially horizontal plane. As a result of this flexion the central region of the bar 20 tends to move in a substantially horizontal plane in the direction of travel A of the tractor. In other words, the central region of the flexible bar 20 tends, under these conditions, to move to the right, as viewed in FIG. 3.

The aforesaid movement of the centre region of the flexible bar 20 induces a forward movement of the lever 40 and, as a result of the engagement of the pin 42 on the free end of the lever 41 in the slot 40a in the lever 40, an anticlockwise rotation (as viewed in FIG. 3) of the L-shaped lever 41. As a result of this rotation of the L-shaped lever 41 the link 33 moves downwards, inducing, by means of the mechanical transmission 34, 35, 36, 37, 38, a movement of the distributor control member 19 from its rest position towards its working position.

When the aforesaid reaction force transmitted from the ground to the implement exceeds a predetermined threshold value, the distributor control member 19 moves into its working position, placing the delivery pipe 15 in communication with the pipe 12 and allowing the supply of pressure fluid to the hydraulic jack 9 to effect lifting of the implement from the ground.

As soon as the implement is lifted out of the ground the flexible bar 20 recovers its original undeformed state, causing the movable control member 19 to return to its idle position, and allowing re-lowering of the implement on to the ground.

In order to speed up the re-lowering of the implement, with the object of ensuring a sufficiently even working of the ground, the device of this invention seeks to anticipate the moment at which the control member of the hydraulic distributor returns to its idle position. Thus as soon as the implement is lifted from the ground, the weight of the implement applies a turning moment to the horizontal linkage arms 3 around their respective pivotal connections to the vertical tie-rods 5. Consequently, the ends of the flexible bar 20 are displaced upwards, tending to induce flexural deformation of the flexible bar 20 in a substantially vertical plane. As a result of this deformation, the centre region of the flexible bar 20 is displaced downwards, causing a clockwise rotation, (as viewed in FIG. 3) of the lever 40 about its fulcrum defined by the support roller 44. Such clockwise rotation of the lever 40 induces a clockwise rotation of the L-shaped lever 41 about its pivotal attachment to the fixed structure of the tractor, by virtue of the engagement of the pin 42 on the L lever 41 in the slot 40a in the lever 40. This causes the vertical link 33 to move upwards, in the opposite direction to that referred to earlier, so that the distortion of the flexible bar 20 in the said vertical plane tends to anticipate the moment at which the distributor control member 19 returns to its idle position, allowing rapid lowering of the implement.

The device of the invention therefore affords a rapid return of the implement to its original working conditions, ensuring a more even working of the ground.

I claim:

1. Device for automatically lifting and relowering an implement carried by an agricultural tractor when a predetermined value of ground reaction force is exceeded, comprising:

means for the articulated linkage of an implement to an agricultural tractor, adapted to allow movements of the implement in a longitudinal vertical plane, said means including at least one pair of lower linkage arms, and respective substantially vertical tie-rods pivotally connected to the two lower linkage arms;

a hydraulic single acting lifting jack having an acturator rod, a lever transmission connecting to said actuator rod to said tie-rods for effecting lifting of the implement;

hydraulic supply means for supplying hydraulic fluid to the said jack;

a hydraulic distributor, interposed between the hydraulic supply means and the lifting jack, for controlling the operation of said jack, the said hydraulic distributor having a control member which is movable between an idle position in which the lifting jack is not supplied with pressure fluid, and the implement is lowered, and a working position in which the lifting jack is supplied with pressure fluid to effect lifting of the implement;

a flexible bar connected at its ends to the said lower linkage arms, and supported for rotation about a transverse axis by the fixed structure of the tractor, in such a manner that the reaction force transmitted from the ground to the implement, when the latter is lowered into the ground, causes flexural deformation of said flexible bar in a substantially horizontal plane, and a mechanical transmission interconnecting the flexible bar and the control member of the hydraulic distributor to cause movement of said control member towards its working position, and effect lifting of the implement, when the said reaction force exceeds a predetermined value, wherein the improvements consist in:

each said substantially vertical tie-rod being pivotally connected to the respective lower linkage arm at a point such that the weight of the implement when the latter is raised from the ground induces rotation of said linkage arm about its respective pivotal connection to the vertical tie-rod, causing flexural deformation of the flexible bar in a substantially vertical plane;

the said mechanical transmission includes a first lever fixed at one end to the central region of the flexible bar, and provided at its opposite end with a slot disposed in a vertical plane, and an L-shaped second lever, pivotally mounted at its apex about a horizontal axis transverse the fixed structure of the tractor and provided at the end of one of its arms with a pin which is engaged slidably in the slot of the first lever; the opposite end of the said second lever being connected to the control member of the hydraulic distributor; said first lever being pivotable about a horizontal transverse axis upon a fulcrum which is displaceable longitudinally relative to the fixed structure of the tractor;

the said guide slot of the first lever is elongate in a direction inclined both to the longitudinal axis of the first lever and also to the longitudinal axis of that arm of the second lever which is provided with the said pin, and longitudinal movement of the first lever due to a forward movement of the central region of the flexible bar, and a rotation of the first lever about the said displaceable fulcrum, due to a downward movement of the central region of the flexible bar, both induce respective rotations, in opposite directions, of the associated L-shaped second lever about its articulation on the fixed structure of the tractor.

2. A device according to claim 1, wherein the displaceable fulcrum of the first lever is constituted by a support roller against which the said first lever bears, and a fixed guide surface contacting said support roller.

* * * * *